(12) United States Patent
Mahoney

(10) Patent No.: US 6,813,341 B1
(45) Date of Patent: Nov. 2, 2004

(54) VOICE ACTIVATED/VOICE RESPONSIVE ITEM LOCATOR

(75) Inventor: Jerome R. Mahoney, Colts Neck, NJ (US)

(73) Assignee: iVoice, Inc., Matawan, NJ (US)

( * ) Notice: Subject to any disclaimer, the term of this patent is extended or adjusted under 35 U.S.C. 154(b) by 375 days.

(21) Appl. No.: 09/653,658

(22) Filed: Aug. 31, 2000

(51) Int. Cl.$^7$ .................................................. H04M 1/64
(52) U.S. Cl. ............................... 379/88.01; 340/572.1; 704/246
(58) Field of Search .................. 379/88.01; 705/22, 705/24, 26, 28, 29; 235/375–378, 383, 385; 340/572.1, 571, 572; 707/104.1, 3, 10; 704/246, 251, 272, 275, 276

(56) References Cited

U.S. PATENT DOCUMENTS

| | | | |
|---|---|---|---|
| 4,783,803 A | * 11/1988 | Baker et al. ................. 704/252 |
| 5,111,501 A | 5/1992 | Shimanuki .................. 379/355 |
| 5,136,634 A | 8/1992 | Rae et al. .................... 379/100 |
| 5,165,095 A | 11/1992 | Borcherding ................ 379/88 |
| 5,168,548 A | 12/1992 | Kaufman et al. .............. 395/2 |
| 5,222,121 A | 6/1993 | Shimada ..................... 379/88 |
| 5,231,670 A | 7/1993 | Goldhor et al. .............. 381/43 |
| 5,239,586 A | 8/1993 | Marui ......................... 381/47 |
| 5,301,227 A | 4/1994 | Kamei et al. ................. 379/88 |
| 5,335,276 A | 8/1994 | Thompson et al. ........... 380/21 |
| 5,349,636 A | 9/1994 | Irribarren ..................... 379/89 |
| 5,390,278 A | * 2/1995 | Gupta et al. ................. 704/243 |
| 5,406,618 A | 4/1995 | Knuth et al. .................. 379/67 |
| 5,602,963 A | 2/1997 | Bissonnette et al. ........ 395/2.84 |
| 5,621,658 A | 4/1997 | Jackson et al. .............. 364/514 |
| 5,631,745 A | 5/1997 | Wong et al. ................. 358/434 |
| 5,671,328 A | 9/1997 | Fitzpatrick et al. ......... 395/2.55 |
| 5,786,764 A | * 7/1998 | Engellenner .............. 340/572.4 |
| 5,850,627 A | 12/1998 | Gould et al. ................. 704/231 |
| 5,884,221 A | * 3/1999 | Wortham ..................... 701/300 |
| 5,899,973 A | * 5/1999 | Bandara et al. ............. 704/256 |
| 5,991,712 A | * 11/1999 | Martin ........................... 704/9 |
| 6,092,045 A | * 7/2000 | Stubley et al. .............. 704/254 |
| 6,148,291 A | * 11/2000 | Radican ....................... 705/28 |
| 6,157,705 A | * 12/2000 | Perrone ................... 379/88.01 |
| 6,394,278 B1 | * 5/2002 | Reed .......................... 209/44.4 |
| 6,408,307 B1 | * 6/2002 | Semple et al. ........... 707/104.1 |
| 6,507,352 B1 | * 1/2003 | Cohen et al. ............... 345/817 |

* cited by examiner

*Primary Examiner*—Fan Tsang
*Assistant Examiner*—Ming Chow
(74) *Attorney, Agent, or Firm*—Kenneth P. Glynn

(57) ABSTRACT

The present invention is an item location system which relies upon voice activation and responsiveness to identify location(s) of item(s) sought by a user. The system includes a continuous speech recognition digital signal processor, a programmable microprocessor interfaced therewith, voice input and user feedback mechanisms, including audio and/or video feedback. Preferred embodiments utilize audio feedback to the user. The continuous speech recognition engine utilizes Hidden Markov Models to create real time continuous speech recognition and feedback.

20 Claims, 3 Drawing Sheets

VOICE ACTIVATED/VOICE RESPONSIVE ITEM LOCATOR

BACKGROUND OF THE INVENTION

1. Field of the Invention

The present invention relates to voice activated/voice responsive item locators, i.e. item directories which direct a user such as a consumer or shopper, to a specific location to view, treat, retrieve, order, purchase or otherwise use the information obtained in the system. Typically, the present invention could be used at retail stores to locate items to be purchased. Alternatively, it could be used at a production facility or distribution facility having a large number of parts, to locate specific parts for an employee. In other embodiments, it could be used in non-commercial entities, such as a public library to locate a particular book. The locator of the present invention relies upon a specific software module to accomplish voice recognition and response, and includes manager programming for customization, updates and modifications.

2. Information Disclosure Statement

The following prior art patents represent various inventions relating to machines involving speech recognition for voice-based operation and thus illustrate known voice recognition applications:

U.S. Pat. No. 5,111,501 to Masanobu Shimanuki describes a telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database storage location to a requestor's facsimile machine over a telephone line which includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

U.S. Pat. No. 5,165,095 to Mark A. Borcherding describes a method for dialing a telephone, using voice recognition to initiate the dialing and to determine the correct telephone number. The dialing is initiated with a spoken dial command that is recognized by using speaker independent templates that are stored locally with respect to the caller's telephone. The correct telephone number is recognized by using speaker dependent template that are downloaded from a central database or by using speaker independent templates stored locally.

U.S. Pat. No. 5,168,548 to Steven Kaufman et al. describes a reporting system which is disclosed herein, a speech recognizer which is used to select selections of text from a report form stored in a computer and to insert recognized terms in the text thereby to generate a report text under voice control. A command interpreter, also responsive to spoken words, initiates creation of the report text and its subsequent storing, printing and transmission. The command processor is responsive to respective spoken commands to select a destination telephone number and to cause the report text to be sent to apparatus for converting report text to image data and for modulating an audio band signal with the image data for facsimile transmission over telephone lines.

U.S. Pat. No. 5,222,121 to Keiko Shimada describes a voice recognition dialing unit of a telephone mounted on a vehicle or similar mobile body and which allows a call to be originated with ease. When the user of the telephone enters a voice command on voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

U.S. Pat. No. 5,231,670 to Richard S. Goldhor et al. describes a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

U.S. Pat. No. 5,239,586 to Kuniyoshi Marui describes a voice recognition system which comprises a handset and a hands-free microphone for generating an input audio signal, a high-pass filter for eliminating low frequency components from the signal from the handset or hands-free microphone, a signal lever controller for adjusting the level of the high-pass signal in response to the user of either the handset or hands-free microphone, a storer for storing the speech data and a controller for controlling the storer so that a user's utterance is stored or the user's utterance is recognized by comparing the utterance to speech data already stored. The handset hook switch provides an on-hook control signal to reduce amplifier gain during hands-free microphone operation.

U.S. Pat. No. 5,301,227 to Shoichi Kamei et al. describes an automatic dial telephone that is useable in a motor vehicle, when a voice input is provided during a period in which input of the names of called parties is awaited, a voice pattern of the name of the called party is compared with reference patterns of called parties stored in reference patterns storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

U.S. Pat. No. 5,335,276 to E. Earle Thompson et al. describes a communication system which is provided with multiple purpose personal communication devices. Each communication device includes a touch-sensitive visual display to communicate text and graphic information to and from the user and for operating the communication device. Voice activation and voice control capabilities are included within communication devices to perform the same functions as the touch-sensitive visual display. The communication device includes a built-in modem, audio input and output, telephone jacks and wireless communication. A plurality of application modules are used with personal communication devices to perform a wide variety of communication functions such as information retrievable, on-line data base services, electronic and voice mail. Communication devices and application modules cooperate to allow integrating multiple functions such as real time communication, information storage and processing, specialized information services, and remote control of other equipment into an intuitively user friendly apparatus. The system includes both desktop and hand-held communication devices with the same full range of communication capabilities provided in each type of communication device.

U.S. Pat. No. 5,349,636 to Roberto Irribarren describes a communication system for verbal telephonic communication which has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

U.S. Pat. No. 5,406,618 to Stephen B. Knuth et al. describes a telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

U.S. Pat. No. 5,602,963 to W. Michael Bissonnette et al. describes a small, portable, hand-held electronic personal organizer which performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of different functions, including voice training, memo record, reminder, manual reminder, timer setting, message review, waiting message, calendar, phone group select, number retrieval, add phone number, security and "no" logic. During such various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data.

U.S. Pat. No. 5,621,658 to Brion K. Jackson describes an action contained within an electronic mail object which is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

U.S. Pat. No. 5,631,745 to John J. Wong et al. describes a telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

U.S. Pat. No. 5,671,328 to Gregory P. Fitzpatrick et al. describes a method and data processing system which are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

U.S. Pat. No. 5,850,627 to Joel M. Gould et al. describes a word recognition system which can: respond to the input of a character string from a user by limiting the words it will recognize to words having a related, but not necessarily the same, string; score signals generated after a user has been prompted to generate a given word against words other than the prompted word to determine if the signal should be used to train the prompted word; vary the number of signals a user is prompted to generate to train a given word as a function of how well the training signals score against each other or prior models for the prompted word; create a new acoustic model of a phrase by concatenating prior acoustic models of the words in the phrase; obtain information from another program running on the same computer, such as its commands or the context of text being entered into it, and use that information to vary which words it can recognize; determine which program unit, such as an application program or dialog box, currently has input focus on its computer and create a vocabulary state associated with that program unit into which vocabulary words which will be made active when that program group has the focus can be put; detect the available computational resources and alter the instructions it executes in response; test if its ability to respond to voice input has been shut off without user confirmation, and, if so, turn that ability back on and prompt the user to confirm if that ability is to be turned off; store both a first and a second set of models for individual vocabulary words and enable a user to selectively cause the recognizer to disregard the second set of models for a selected word; and/or score a signal representing a given word against models for that word from different word model sets to select which model should be used for future recognition.

Notwithstanding the prior art, the present invention is neither taught nor rendered obvious thereby.

SUMMARY OF THE INVENTION

A voice activated/voice responsive item locator system is disclosed to enable a user to speak into the system and have the system respond with location information for an item requested by the user. For example, shopper at a home supply store may pick up a locator phone or just speak into a wall mounted or otherwise situated microphone and say "Locate Outdoor Paint" or "Find Hammers" or simply state what is sought without the use of a verb, e.g. "Caulking". The system may reply either with voice or visual (words on a screen, or map), or both voice and visual, e.g. "Aisle 3, Shelf 4". In some instances the system will reply, for example, with a "Repeat", or "Restate in different words" or "Please talk to information desk" or other default instructions.

The locator system may be a stand alone device, but in most embodiments would be part of an internal connected system. It could be an intranet or secured internet system, but would in many cases be a storewide system with a plurality of user locations (units, phones, or microphones, with feedback at each location). The system will include an embedded voice-driven interface for speech control of: (1) operational instructions; (2) core system locator function operations, that is, recognition of specific requests and responses thereto; and, (3) optional and default functions. In preferred embodiments, the present invention device is both operated by speech (speech or voice activated) and speech responsive (voice answers and instructions to the user from the system). Thus, the present invention device relies upon automatic speech recognition (ASR), either in place of or in addition to manual locator systems, e.g. book, list, map and computer directories. In some embodiments, user feedback features are included wherein both audio and visual feedback is given to a user in response to recognizable voice signals, while in other possible embodiments, the user may designate audio or visual.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention is a voice activated/voice responsive item locator and system. By "item" is meant a place or thing that a user desires to locate. Thus, an item could be a particular brand of canned string beans, a type of outdoor stain, a booth at a convention, a particular part in inventory for sale, assemblage or distribution, a particular automobile in a production facility lot or in a large parking garage, or a room, afunctional group or a person in an office building or the like. The response may be in the form of a word or sentence presented visually or audibly and it may designate an aisle, a shelf, a bin number, a rom number, a row and slot or space, etc.

The voice recognition system digitizes words spoken via a receiver (microphone) handset, headset, or built-in microphone for conversion from analog to digital utilizing a continuous speech recognition digital signal processor (DSP). The main support structure may be a conventional type housing for phones and other communications devices, may be of a different shape or configuration or may be built into a device such as a wall or desk unit, with or without monitor. They could be portable or permanently affixed and could be powered by any means available, e.g. AC or DC current. In the portable mode, the system would be wireless for the user and would, in that respect operate like a cell phone, two way radio, "walkie talkie" or other short distance wireless device, but would have a processor at a central or fixed location having the same features as described above, i.e., the DSP with programming capabilities, etc.

The DSP is connected to a programmable microprocessor and either by customized input or a standard program, the system enables the user to quickly enter voice-activated fields, e.g., such as "Where is . . . ", "Find . . . ", etc. Verification of voice recognition accuracy (prior to execution) is optional and may be accomplished via synthesized voice playback and/or a screen confirmation which requires a "YES" or "NO" to execute or open for revision. In some preferred embodiments, a screen, e.g., LCD, enables visual feedback during input phase, with support for deletion, insertion, correction, etc. Cancellation of the entire command or programming instructions may be possible at any time (prior to execution), via keystroke or voice command.

The essential features of the present invention involve the creation of a voice based guide or locator to offer enhanced convenience and speed to users for location of one or more items.

Figure 1:
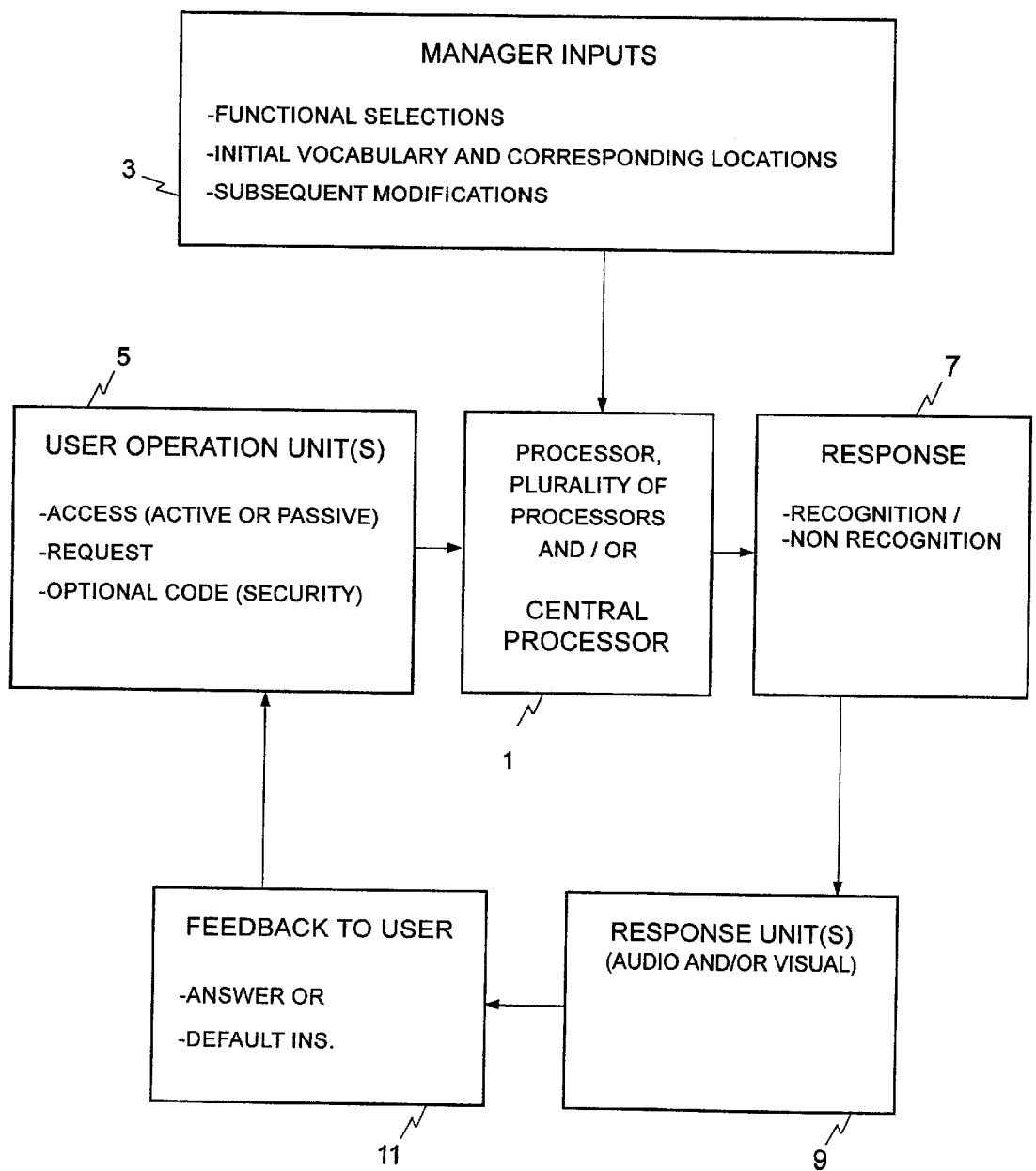
FIG. 1 shows a general schematic diagram showing software and functional features of a present invention item locator system.

FIG. 1 shows a general schematic diagram of a present invention system showing general software features and functional features. Thus, the present invention device includes a central processor 1 which may be an external or internal component, i.e., within a single unit or at a separate location from audio receivers and transmitters, e.g., microphones/speakers for user inputs and feedback to users.

The system may be preprogrammed with the user being required to follow concise instructions for activation and operation, or may be programmable to alter, add or enhance ease or methods of use, e.g. through a limited access code, for manager inputs 3 of user instructions. In any event, manager inputs 3 shall include functional selections and inputs of items and their locations, with provision for subsequent access for modifications. This programming may include direct keyboard, voice, etc., and, as mentioned, may include security capabilities for preventing unauthorized use, e.g. voice identification (user recognition) or user security code system, as well as other options which may be included therein, such as a "help" detailed manager instruction section.

Once the system has been programmed for use, the user operation unit(s) 5 provide functional access, which may be passive, i.e., the user speaks, picks up a phone, presses a button, or otherwise takes some action to activate the system; or it may be active, i.e., a proximity sensor, a periodicity timer, or other internal mechanism may automatically activate the system and could trigger an audio or visual query, such as "May I help you locate a product?"

Once the system has been activated and a user has stated the necessary words of input to activate the device, recognition/non-recognition response 7 results from processing the user inputs to central processor 1, and audio and/or video response unit(s) 9 provide feedback 11 to the user, either by answering the inquiry, conditionally defaulting, e.g., asking for a repeat or a restate the question, or fully defaulting, e.g. directing the user to a courtesy desk or check out counter for help.

Figure 2:
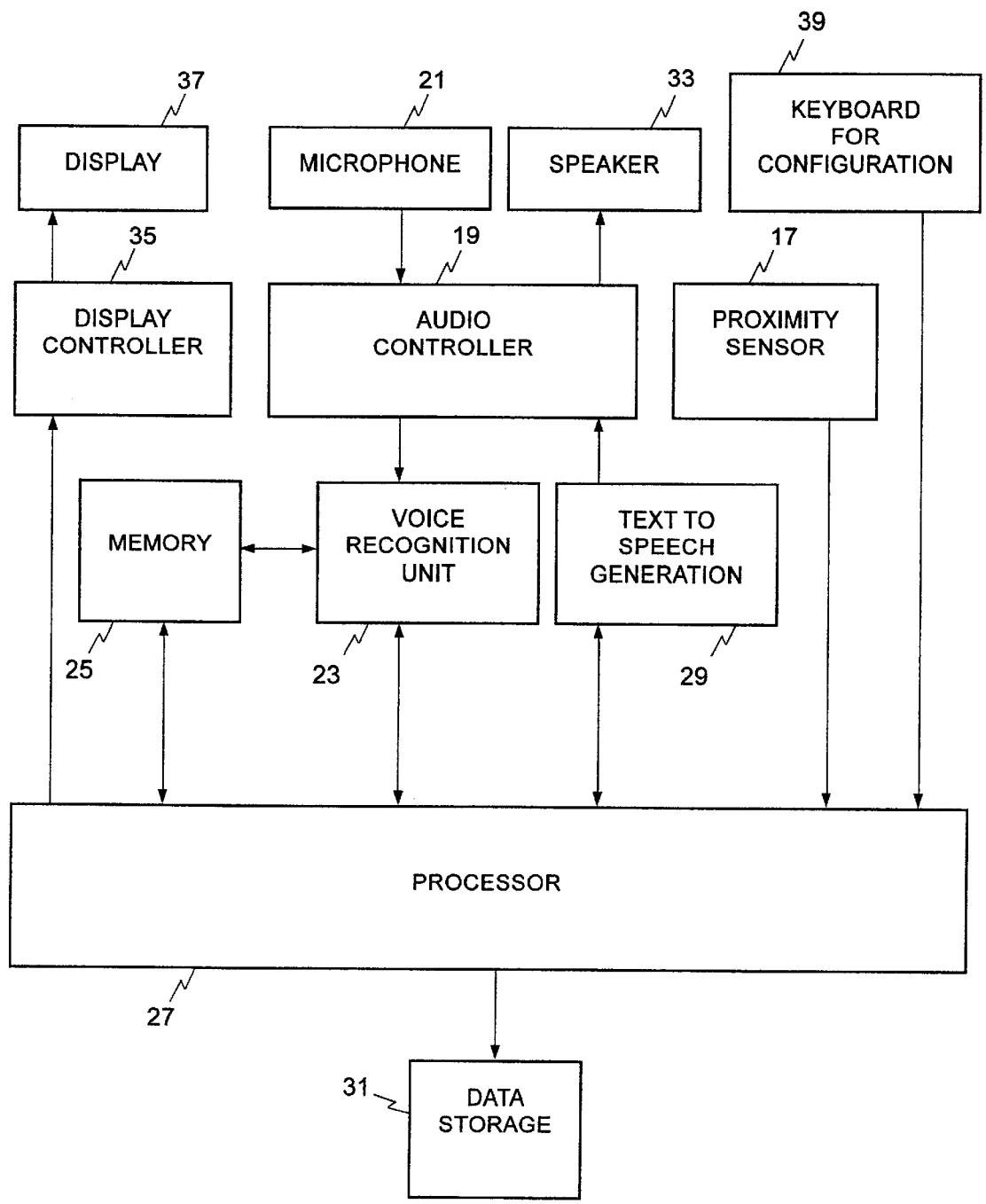
FIG. 2 shows a schematic diagram illustrating the physical functions of a present invention voice recognition item locator device; and, FIG. 3 shows a schematic diagram of a present invention device illustrating details of a voice recognition submodule.

FIG. 2 shows a schematic diagram illustrating a present invention voice activated/voice responsive item locator system, showing the physical arrangement and function of components. Thus, symbol 17 indicates an optional user prompter proximity sensor and symbol 21 is a microphone or equivalent component for voice input. The voice input is sent to audio controller 19 and to automatic speech recognition unit 23 and is converted from analog to digital signals. The speech recognition unit 23 communicates with a continuous speech signal recognizer 41 and a continuous speech signal interpreter 43. CPU/Memory 25 compares the digital signals to the set up or dictionary of digital words or phrases in memory. Once a match is found, the system processor 27 and data storage 31 operate to respond with an answer or a default instruction or a query by providing digital text to text-to-speech generator 29, which provides audio feedback to a user via audio controller 19 and speaker 33. Feedback to a user may also be provided on visual screen 37 via display controller 35. Keyboard 39 is used for manager set up and modifications.

Figure 3:
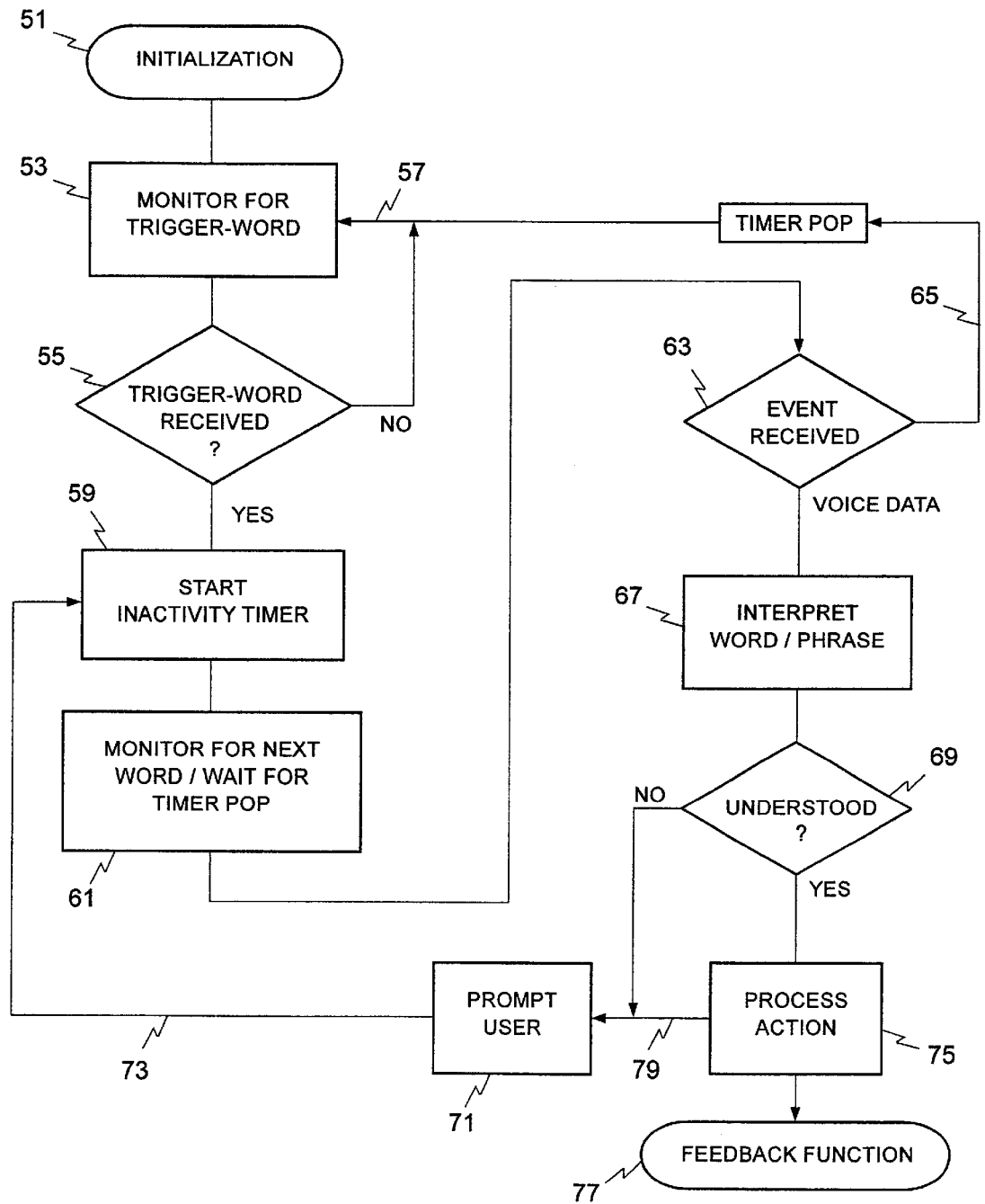

FIG. 3 shows the details of one preferred embodiment of the submodule used in the present invention device. The voice recognition component converts an acoustic signal into a sequence of labels. The system takes the raw acoustic data, and processes it through the recognizer. The recognizer then matches it against a set of models using a decoder that generates a recognition token. This token represents what the user said as either a single word or utterance. The recognizer itself does not interpret the meaning of the recognized output, that is the function of the interpreter (described later). The recognizer uses Hidden Markov Models (HMMs) to provide for a continuous speech recognition engine. HMMs do not process the acoustic signal directly but instead split the signal into a sequence of discrete observations. These observations are derived from a digital representation of the signal that had been converted from the analog signal generated by the microphone. During recognition, the likelihood of each model (or sequence of models) matching the incoming signal is calculated. The recognizer simply selects the most likely model to decode the signal. As this is done continuously, the recognizer can process speech as opposed to isolated words, allowing the user to talk more naturally.

Each acoustic model represents a short sound. The interpreter combines these sounds into words using a dictionary. This dictionary specifies the pronunciation of each word in terms of the acoustic models. After identifying the most likely word, the interpreter then joins sets of models together (using a Viterbi decoder) in a series of pre-defined connections such that paths can be established to provide for a degree of "natural language" recognition; in other words, the user can say "Find hammers", "Where are hammers" or "hammers" and they are all understood to mean the same thing. Moreover, these sets of models and dictionaries are interchangeable, allowing the same voice recognition component to be used in a variety of applications.

As the voice recognition component is running continuously, there needs to be a way to distinguish background conversations that might accidentally trigger an unwanted action by the device. For example, two people standing by a voice-activated device might be discussing locations of different goods in a supermarket and be misinterpreted or undesireably responded to. To avoid this problem, the recognition unit requires a command word to trigger before beginning further recognition. The trigger word is a user-definable setting.

Thus, in FIG. 3, initialization 51 initiates monitoring 53 for a trigger word from a user. When a word is received, it is analyzed to determine whether or not a trigger word 55 has been received. If not, signal 57 returns the status to monitoring 53 for a new word. This loop continues until a trigger word is recognized and an inactivity timer 59 is started. The monitor 61 proceeds with the monitoring for the next word and waits for timer pop 65. When an event 63 is received, timer pop 65 returns to the monitor 53 to continue the monitoring process and the voice data is sent to interpretation 67. If it is understood 69, an action 75 if process and feedback function 77 is performed. Additionally, signal 79 prompts user 71. Likewise, if the interpretation is not understood 69, user 71 is prompted and via signal 73, timer 59 begins again. These cyclings operate on a continual basis while the system is initiated. Voice activation may also be used to shut down the system.

Obviously, numerous modifications and variations of the present invention are possible in light of the above teachings. It is therefore understood that within the scope of the appended claims, the invention may be practiced otherwise than as specifically described herein.

What is claimed is:

1. An item locator system having both voice activation and voice responsive capabilities for location feedback to locate one or more specific goods in a retail store, which comprises:

a.) a support structure, for physically supporting said system at one or more locations, and functionally containing or connected to the following components:

b.) a continuous speech recognition digital signal processor (DSP), said continuous speech recognition engine utilizes tokens of raw acoustic signals representing utterances or words and matches these against a set of models and then relies upon likelihood to select a most likely model to decode signals for interpretation;

c.) a programmable microprocessor interfaced with said speech recognition DSP;

d.) sufficient programming and circuitry contained within said programmable microprocessor to provide for voice activation and voice recognition and response to provide item location to a user wherein item and location data are defined by manager input to said system;

e.) voice input means connected to said speech recognition DSP;

f.) memory storage means connected to said programmable microprocessor for storage of operational inputs, control inputs, voice recognition vocabulary for storage of command match and execute functions;

g.) at least one user feedback unit and connection from said programmable microprocessor to said at least one user feedback unit, said at least one user feedback unit adapted to provide feedback selected from the group consisting of audio feedback, visual feedback and combinations thereof, to a user in response to an item location query.

2. The system of claim 1 wherein said user feedback unit includes visual display means for viewing visual feedback in the form of text, or map or a combination thereof.

3. The system of claim 1 wherein said user feedback unit includes sufficient hardware and software to provide audio feedback to a user in response to recognizable voice input.

4. The system of claim 1 wherein said memory storage means further includes flash ROM storage and provides for remote diagnostics and system programming.

5. The system of claim 1 wherein said voice input means includes a microphone.

6. The system of claim 1 which further includes a secured manual control panel for input and management of item and location data into said system.

7. The system of claim 6 wherein said manual control panel further contains a keypad and menu for operation and programming options, a microphone, a screen for input and feedback display.

8. The system of claim 1 which additional components further includes an audio feedback component which includes audio feedback hardware and software adapter to audibly respond to recognizable voice input, including digital-to-analog conversion and an output speaker.

9. The system of claim 1 wherein said DSP includes a continuous speech recognition engine having a continuous speech signal recognizer and a continuous speech signal interpreter.

10. The system of claim 1 wherein said programming and circuitry within said programmable microprocessor includes embedded, voice driven interface for control of operational instructions, system locator function operations, and option and default functions.

11. The system of claim 1 wherein said response to provide item location to a user includes aisle location.

12. The system of claim 1 wherein said response to provide item location to a user includes shelf location.

13. The system of claim 1 wherein said response to provide item location to a user includes aisle and shelf location.

14. The system of claim 1 wherein said response to provide item location to a user includes bin number.

15. The system of claim 1 wherein said response to provide item location to a user includes row and slot location.

16. The system of claim 5 wherein said microphone is selected from the group consisting of a receiver handset, headset, and built-in microphone.

17. The system of claim 1 wherein said support structure is a portable support structure.

18. The system of claim 1 wherein said speech recognition engine uses Hidden Markov Models for its continuous speech recognition engine.

19. The system of claim 6 wherein said speech recognition engine uses Hidden Markov Models for its continuous speech recognition engine.

20. The system of claim 8 wherein said speech recognition engine uses Hidden Markov Models for its continuous speech recognition engine.

* * * * *